United States Patent [19]
Saw

[11] Patent Number: 6,075,819
[45] Date of Patent: Jun. 13, 2000

[54] APPARATUS FOR VIDEO RATE CONTROL USING FUZZY RULE-BASED CONTROL

[75] Inventor: Yoo-sok Saw, Seoul, Rep. of Korea

[73] Assignee: LG Information & Communications, Ltd., Seoul, Rep. of Korea

[21] Appl. No.: 09/032,952

[22] Filed: Mar. 2, 1998

[30] Foreign Application Priority Data

Mar. 26, 1997 [KR] Rep. of Korea ................ 97-10584

[51] Int. Cl.⁷ ............................................. H04N 5/262
[52] U.S. Cl. ................ 375/240; 364/514; 358/135; 358/136; 382/236; 382/238; 382/232; 382/239; 382/253; 382/251
[58] Field of Search ..................... 348/405, 419; 341/200; 382/251

[56] References Cited

U.S. PATENT DOCUMENTS

| | | | |
|---|---|---|---|
| 5,038,209 | 8/1991 | Hang | 358/136 |
| 5,475,433 | 12/1995 | Jeong | 348/419 |
| 5,502,493 | 3/1996 | Meyer | 348/426 |
| 5,610,659 | 3/1997 | Maturi et al. | 348/42 |
| 5,649,030 | 7/1997 | Normile et al. | 382/253 |
| 5,703,966 | 12/1997 | Astle | 382/236 |
| 5,790,195 | 8/1998 | Ohsawa | 348/419 |
| 5,805,222 | 9/1998 | Nakagawa et al. | 348/401 |
| 5,847,761 | 12/1998 | Uz et al. | 348/404 |

*Primary Examiner*—Christopher S. Kelley
*Assistant Examiner*—Shawn S. An
*Attorney, Agent, or Firm*—Fleshner & Kim, LLP

[57] ABSTRACT

Fuzzy rule-based control is applied to video rate control in the present invention. A basic fuzzy logic controlling apparatus using the occupancy as a fuzzy control variable is provided. Other fuzzy logic controlling apparatus is also provided: the video quality-controlled, the scene change based and the quality-monitored. The occupancy-based controlling apparatus is adopted to form a backbone scheme. The accumulative quality measure and the scene change features are then introduced to improve the video quality. The quality-monitored FRC (FRC-QM), which is controlled by both the quality factor and the scene change-based factor, is superior to the other schemes in respect of both the occupancy and the quality.

6 Claims, 7 Drawing Sheets

Fig. 5

| FUZZY LOGIC VARIABLE | | | | | |
|---|---|---|---|---|---|
| OCCUPANCY (FVO) | | DIFFERENTIAL OCCUPANCY (FVD) | | QUANTIZER SCALE (FVQ) | |
| FL | FULL | PB | POSITIVE BIG | HG | HUGE |
| CF | CLOSE TO FULL | PM | POSITIVE MEDIUM | LG | LARGE |
| HH | HIGHRER THAN HF | PS | POSITIVE SMALL | LM | LARGER THAN MD |
| HF | HALF FULL | ZE | ZERO | MD | MEDIUM |
| LH | LOWER THAN HF | NS | NEGATIVE SMALL | SM | SMALLER THAN MD |
| CE | CLOSE TO EMPTY | NM | NEGATIVE MEDIUM | SL | SMALL |
| ET | EMPTY | NB | NEGATIVE BIG | TN | TINY |

Fig. 6

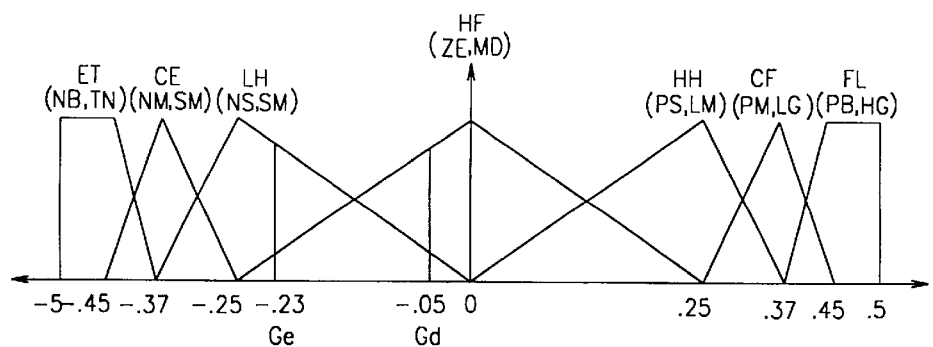

Fig. 7 a
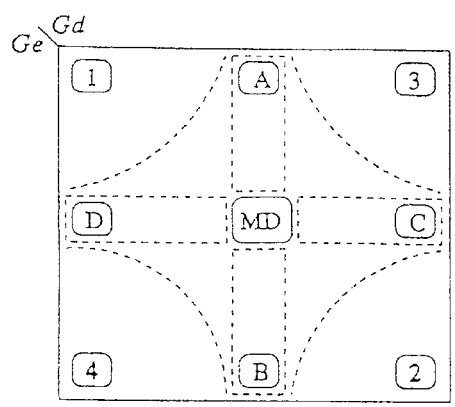
Fig. 7 b
| Gd / Ge | NB | NM | NS | ZE | PS | PM | PB |
|---|---|---|---|---|---|---|---|
| ET | TN | TN | TN | TN | SL | SM | MD |
| CE | TN | TN | TN | SL | SM | MD | LM |
| LH | TN | TN | SL | SM | MD | LM | LG |
| HF | TN | SL | SM | MD | LM | LG | HG |
| HH | SL | SM | MD | LM | LG | HG | HG |
| CF | SM | MD | LM | LG | HG | HG | HG |
| FL | MD | LM | LG | HG | HG | HG | HG |
Fig. 7 c
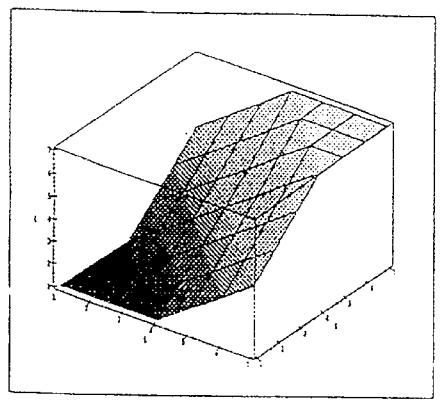
Fig. 7 d
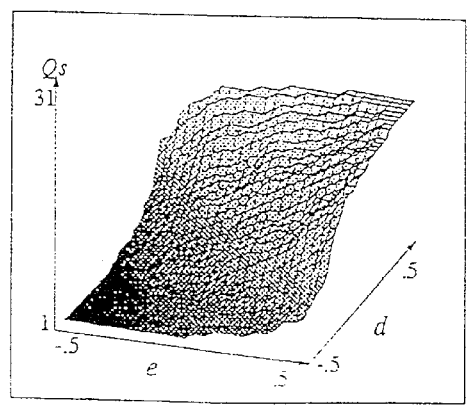
Fig. 8
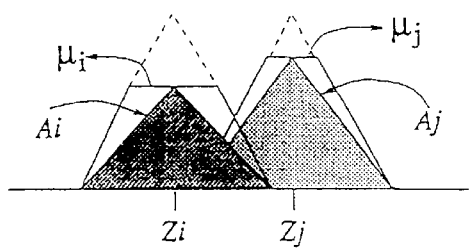

APPARATUS FOR VIDEO RATE CONTROL USING FUZZY RULE-BASED CONTROL

BACKGROUND OF THE INVENTION

The present invention relates to an apparatus for controlling video rate using a fuzzy rule-based control scheme for MPEG video encoder.

Video rate management has been a challenging technical task in the field of video communication to ensure that the utilization of the transmission media is maximized and that the service delivers the required level of video quality regardless of the input video rate variation. The necessity for video rate control arises particularly in the constant bit rate (CBR) applications which transmit a wide range of rapid motion video via fixed rate channels. MPEG phases 1 and 2 have been established for the CBR transmission of variety of video such as movies, sports, as well as for variable bit rate (VBR) communication.

For VBR MPEG video transmission, modeling of the compressed video appears as the core task to be tackled since its statistical properties provide a sound base for a strategy to achieve an optimum effective bandwidth allocation. Much research work has been performed for establishing an optimum models of compressed video.

For CBR MPEG transmission, buffering, which stores the compressed video in a first-in-first-out buffer for a specified period of time, is widely used to adapt the variable-bit-rate video to a fixed rate channel. In the buffering, the quantiser is the core function to control the video rate. However, the MPEG standards do not specify the details of the rate control process since they depend entirely on a specific design. On the other hand, MPEG 2 Test Model specifies the detail and is developed as a performance benchmark.

FIG. 1 is a block diagram showing a general video rate controller of the MPEG. In FIG. 1, encoder 2 encodes a quantised video using a variable length coding method. Buffer 3 stores the compressed and quantized video signal to smooths bursty data rate variation of compressed video. The occupancy represents the portion of the buffer capacity which is filled with the compressed video data awaiting transmission. The occupancy value (O) is input to a buffer/quantizer regulator 4. The buffer/quantizer regulator 4 determines a quantization step size (Qs) depending on the buffer occupancy. The larger value of the buffer occupancy, the larger value of the quantisation step size is determined. The occupancy value of the specific time point informs a quantizer 1 of which step size should be taken for the next encoding operation. The quantizer 1 quantises the Discrete Cosine Transform (DCT) output according to the quantisation step size (Qs).

In TM5 the rate control algorithm is based on one-step ahead estimation using a picture complexity measure. This scheme allocates a certain number of bits to each picture with equations for calculating the target number of bits. It consists of three steps: firstly estimating the target number of coded bits and a mean quantisation scale for the previous picture; secondly calculating the quantisation step size for a whole picture, (base on the current buffer occupancy); and finally, local adaptation of the framewise quantisation step size is performed for a single macro block using a normalized activity in the macro block. In the bit allocation process, bits are allocated to each type of picture (I, P and B picture) in compliance with the approximate ratio of I:P:B=8:3:2, if the input video dose not contain rapid moving pictures, i.e. if the scene change features of adjacent pictures are similar. The buffer occupancy is calculated by subtracting the actual number of coded bits from the estimated target bits. Hence, the rate control process of TM5 is considered to directly exploit similarities in the video. However, if the video contains large picture-to-picture variation, the number of target bits will differ significantly from the actual coded bits. Likewise, the activity change in the macroblock often has a large variation if a picture has a large amount of details inside it. This may cause large fluctuations in the occupancy and in the quantisation value. Therefore, if a rapid scene change occurs in the incoming video, extremely high occupancy or overflow may happen. The case of buffering malfunction is overflow when a dramatic increase in the video rate cannot be accommodated in the finite length buffer.

SUMMARY OF THE INVENTION

In the present invention, we applied fuzzy logic, which is known to be robust in feedback control, to video rate control. It is also known to be effective in conveying the meaning of linguistic variables to the target system. In addition to a series of conventional fuzzy logic experiments for the constant bit rate MPEG transmission, adaptive and supervisory fuzzy logic control schemes have also been applied.

The conventional FRC consists of a widely used set of fuzzy rules and common fuzzification and defuzzification processes. For this scheme we tested different values of the three critical parameters; scaling factors for fuzzy inputs and outputs, membership functions and fuzzy control surfaces. In the scene change-assisted FRC scheme, scene change parameters were used to adaptively change the scaling factors. For the quality-monitored FRC, a set of fuzzy rules for PSNR were derived and it was applied along with that of the buffer occupancy.

BRIEF DESCRIPTION OF THE DRAWINGS

FIG. 5 is a table of three fuzzy variables of the embodiment of the invention;

FIG. 6 shows a membership function used in the embodiment of the invention.;

FIG. 7 shows a FAM (Fuzzy Associative Memory) used in the embodiment of the invention;

FIG. 8 illustrates a simplified defuzzification process used in the embodiment of the invention;

DETAILED DESCRIPTION OF THE PREFERRED EMBODIMENT

Preferred embodiments of the invention will be described below in more detail with reference to the accompanying drawings.

Figure 1:
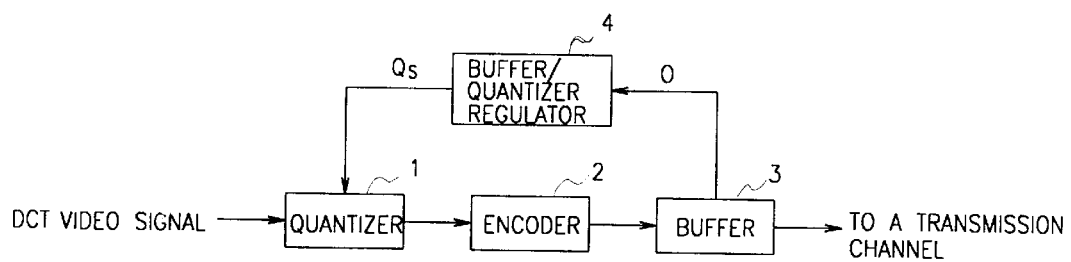
FIG. 1 is a block diagram showing a general video rate controller of the MPEG.
Figure 2:
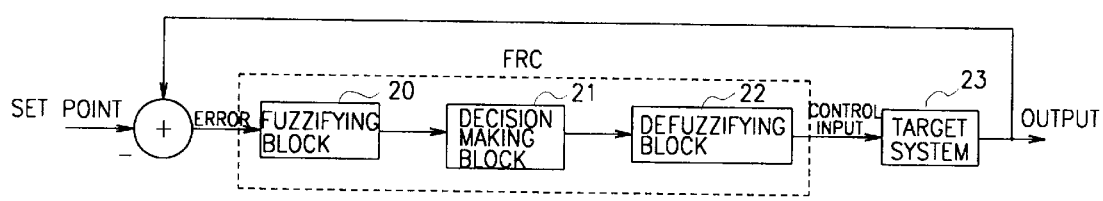
FIG. 2 shows a basic configuration of fuzzy rule-based control.

First, a brief overview on fuzzy rule-based control techniques is given. FIG. 2 shows a basic configuration of fuzzy rule-based control. As shown in FIG. 2, the fuzzy rule-based technique follows a series of common process; fuzzification a, rule-base (decision making) and defuzzification. The output of the target system is controlled by a feed-back to the fuzzy rule-based control which takes the error between output and set point—the target value of the output. FRC (Fuzzy Rule-based Control) projects the meaning of linguistic variables defined in the rule set onto a crisp value of error using the fuzzification and the rule base. Then, the defuzzification process converts the linguistic meaning to control input which is used in the target system.

The fuzzy logic control has also been used effectively in image processing and computer vision. The fuzzy rule-based control techniques used in this area have the same technical base to in that they appeared to follow a series of common processes; fuzzification, decision making and defuzzification. However, they differ from one another in terms of the number of rules and input variables, and the layout of membership functions. They can also be discriminated by the process of defuzzification, which is also called fuzzy reasoning (approximate reasoning).

Figure 3:
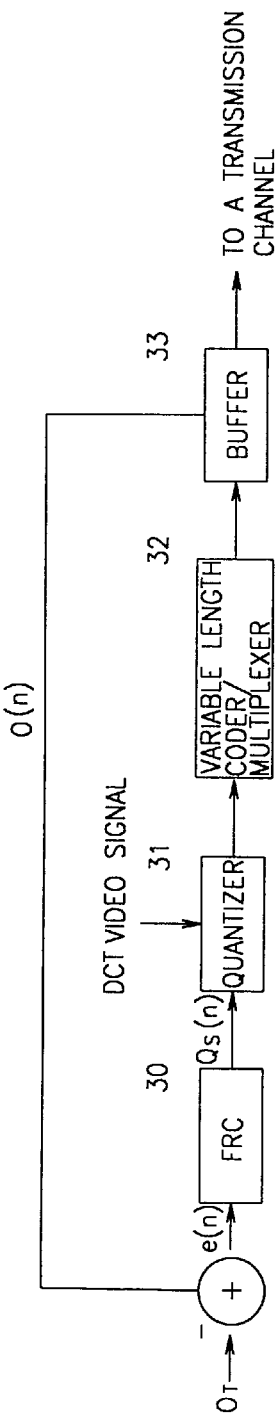
FIG. 3 shows the configuration of the FRC-based video rate control according to the 1st embodiment of the invention.
Figure 4:
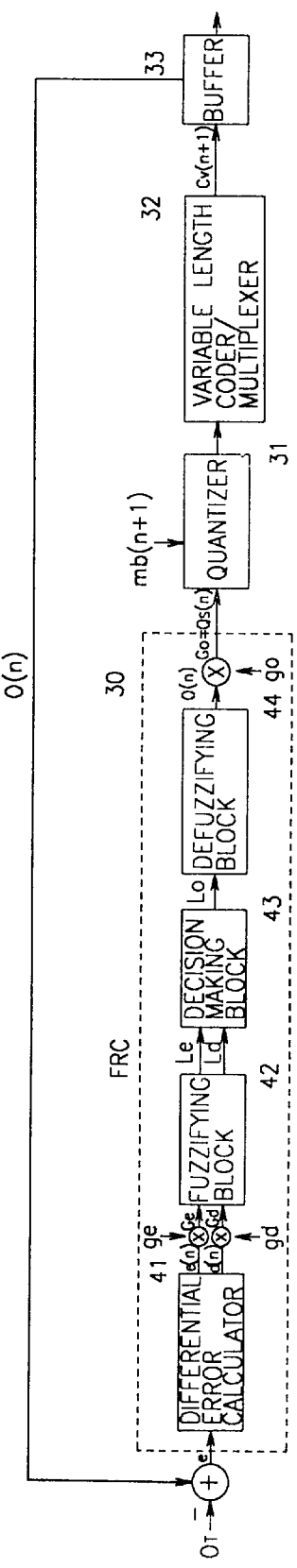
FIG. 4 shows the detail configuration of the FRC-based rate control shown in the FIG. 3.

FIG. 3 shows the configuration of the FRC-based video rate control according to the 1st embodiment of the invention. FIG. 4 shows the detail configuration of the FRC-based rate control shown in the FIG. 3. As shown in FIG. 3, FRC 30 operates between the buffer 33 and the quantizer 31. The occupancy from the buffer 33 is subtracted from the set point which represents required occupancy or delay. The resulting error becomes a crisp input value for FRC 30 to generate quantization step size at the end of its process. Thus, FRC 30 relates only to the buffering and the quantization functions in the basic fuzzy logic control. As shown in FIG. 4, after encoding nth macroblock the buffer 33 outputs the occupancy (O(n)) resulted from compression of nth macroblock. The error signal e, which is the difference between $O_T$ (target occupancy) and a current occupancy O(n), becomes the input of FRC. The process of FRC begins with calculating the differential error value d(n). A differential error calculator 41 subtracts the previous error value e(n−1) from the current error value e(n) and outputs the current error value e(n) and the differential error value d(n). And then, the error value e(n) and the differential error value d(n) is scaled by multiplying them with each scaling factors, ge, gd to give two inputs of a fuzzification block 42 Ge, Gd. Ge, Gd are translated into the linguistic expression Le, Ld in the fuzzification block 42 based on a membership functions. In the decision making block 43, from two linguistic variables Le, Ld, decision making process outputs a linguistic judgement Lo based on a predetermined set of rules. The defuzzification block 44 calculates the intermediate output o(n) by combining the membership function of Lo and those of Le and Ld in a set theoretic way; intersection or union. The final output of the FRC Go is obtained after scaling the output o(n) by scaling factor go. For video rate control the final output of the FRC is a quantization step size Qs(n). The quantization step size Qs(n) is input to a quantizer 31 of the video encoder and used for the next macroblock mb(n+1) to output the corresponding compressed bit stream Cv(n+1).

The scaling factors, ge, gd and go are constants and can be tuned depending on the dynamic ranges of corresponding inputs (e(n) and d(n)) and output (o(n)). The bigger values they takes, the quicker response to the change of inputs can be achieved. In video rate control go may be fixed at 1.0 since the actual output Qs is adjusted onto the legal range of MPEG2 quantization scale. ge and gd can be set to specific values suitable for the dynamic ranges of e(n) and d(n). The scaling factors are considered to be adaptively controlled by a supervisory or an adaptive control function.

FIG. 5 is a table of three fuzzy variables of the embodiment of the invention. As shown in FIG. 5, three fuzzy variables FVO, FVD and FVQ are presented, each of which consists of 7 fuzzy sets. FVO is used for representing the meaning of the buffer state (e) with the central fuzzy set (HF: half full) and two extremes (FL; full and ET; empty). FVD represents the meaning of the differential value of error, i.e. d. FVD has widely been used in various fuzzy logic applications as it signifies generally acceptable meanings of control variables. FVO and FVD exhibits an equivalent capability to represent fuzzy control meanings since they have the same number of fuzzy sets and similar connotations.

FVO, which is used for Ge, takes 50% occupancy (HF) as a central value for a given delay requirement. If occupancy is higher than 50% the but lower than 65%, it can be said to be in HH state, if it is higher than 65% and lower than 85%, close to buffer full (CF) state. The buffer states in the empty side can be fuzzified in the same way. The fuzzy variable FVQ is used for the quantization scale as it can sufficiently express the meaning of its value to be used for a certain condition of input variables (FVO and FVD).

A fuzzy variable corresponds to a predetermined membership function with a shape of triangle, trapezoid or a Gaussian function. In the present invention, the triangular shape is used because of computational simplicity. The same membership function, which is mapped on to a normalized range from −0.5 to +0.5, is used for two inputs (Ge and Gd) and the output (Go) under the assumption that all the control variables have similar dynamic property associated with the membership functions.

FIG. 6 shows a membership function used in the embodiment of the invention. Generally, a membership function can be asymmetrical since the positive section of crisp value and the negative section of the crisp value can have different significance. In video rate control of the present invention, however, both sections are assumed to have unbiased linguistic interpretation. Thus, membership functions shown in FIG. 6 are symmetrical with respect to the center value 0. The membership function of the present invention has wider spacing in the mid-range and narrower spacing in end ranges. The narrower spacing of mid-range has quicker response to crisp value change in comparison to the wider spacing, but the narrower spacing of mid-range membership function has problems related to stability; overshoot, undershoot, and oscillation.

The complete representation of the fuzzy rules can be either in IF . . . THEN statements or in a tabular form which is usually called fuzzy associative memory (FAM). The FAM representation is known to be more efficient in handling a complicated organization of the fuzzy rules. FIG. 7 illustrates the procedure of forming the FAM (Fuzzy Associated Memory) and its control surface used in the embodiment of the invention. FIG. 7(a) depicts the significance of each boxed area in the FAM. MD matches to the center position of the FAM where Ge is HF and Gd is MD, that is, the occupancy remains in the half full range, and its variation is very small. In this condition, it is not required to take drastic control action to the quantization step size, thus, the middle (MD) range becomes the corresponding scale value. The area, A, B, C and D represent the input conditions where either Ge or Gd remains steady. In A and B, since Gd is ZE, fuzzy sets for Qs are allocated depending on the fuzzy sets of Ge, as shown in FIG. 7(b). Since Ge is HF, in C and D areas, Gd affects the allocation of fuzzy sets for Qs in the same way. The areas in the corners (1, 2, 3 and 4) corresponds to the input conditions where both Ge and Gd influence the allocation of fuzzy sets for Qs. Area 1 signifies that the occupancy has decreased dramatically to the empty state since Gd is NB (negative big) and Ge is ET (empty). In this condition, a required control action should be taken to recover the occupancy quickly. Accordingly, the upper triangular area in FAM (FIG. 7(b)) is filled with TN, i.e., the smallest quantization step size values. On the other hand, area 2 represents that the occupancy has increased dramatically to the full state since Gd is PB (positive big) and Ge is FL (full). Therefore, the occupancy should down to the normal state (HF) by applying larger quantization step size values, e.g., HG. This results in that the lower triangular area of the FAM is filled with HG. The area 3 and 4 do not have physical meanings associated with actual buffer operations. Area 3 means that the occupancy has reached the empty state by topping up the previous occupancy by the difference corresponding to PB. However, this cannot occur in the actual situations because there is no lower occupancy level than the empty state. Likewise, area 4 cannot hold a qualitative meaning, since the occupancy cannot reach fill state by dropping it from further higher occupancy, which is non-existent. Thus, the areas 3 and 4 are filled with the same fuzzy sets in the diagonal direction. Considering all these conditions, a FAM configuration appears as shown in FIG. 7(b) and FIG. 7(c). The resulting control surface is shown in FIG. 7(d).

Fuzzification and decision making processes using the same membership function and the same FAM is explained in this specification. For example, if Ge is −0.23 and Gd is −0.05, Lo is related to the rules (SL, SM, SM and MD) with two input values, 4 membership function values—$u_{HH}$ (Ge=−0.23), $u_{HF}$(Ge=−0.23), $u_{NS}$(Gd=−0.05) and $u_{ZE}$(Gd=−0.05)—come out by mapping each input value to corresponding membership function. In the next step, two dominant membership function values are selected based on either intersection or union. Here, intersection is used. For Ge, since $u_{HF}$(Ge=−0.23) is smaller than $u_{HH}$(Ge=−0.23), $u_{HF}$(Ge=−0.23) is taken. Likewise, $u_{HH}$(Gd=−0.05) is smaller than $u_{ZE}$(Gd=−0.05), $u_{NS}$(Gd=) is selected. Each selected membership value is used to defuzzify the output into a crisp value o using center of gravity.

FIG. 8 illustrates a simplified defuzzification process used in the embodiment of the invention. In FIG. 8, $u_i$ and $u_j$ are selected membership function values and $A_i$ and $A_j$ represent the areas covered by shaded triangles bounded by trapezoids. $Z_i$ and $Z_j$ are normalized crisp values of o(n). The ratio Z is given by equation (1) as below.

$$A = A_i + A_j \qquad (1)$$
$$W = A_i Z_i + A_j Z_j$$
$$Z = \frac{W}{A}$$

The final output of the FRC Go is obtained after scaling the output o(n) by scaling factor go which equals 1. For video rate control the final output of the FRC is a quantization step size Qs(n). The quantization step size Qs(n) is input to a quantizer of the video encoder and used for the next macroblock mb(n+1) to output the corresponding compressed bit stream Cv(n+1).

The basic configuration of FRC for video rate control of the present invention which is shown in FIG. 3, takes only the occupancy of a buffer as fuzzy variables. Therefore the video quality is not considered. For a more advanced approach, FRC using the scene change features and quality-monitored FRC schemes are described in this invention. In both of the FRC using the scene change features and quality-monitored FRC scheme, membership function and FAM are the same as the basic configuration of the FRC.

Figure 9:
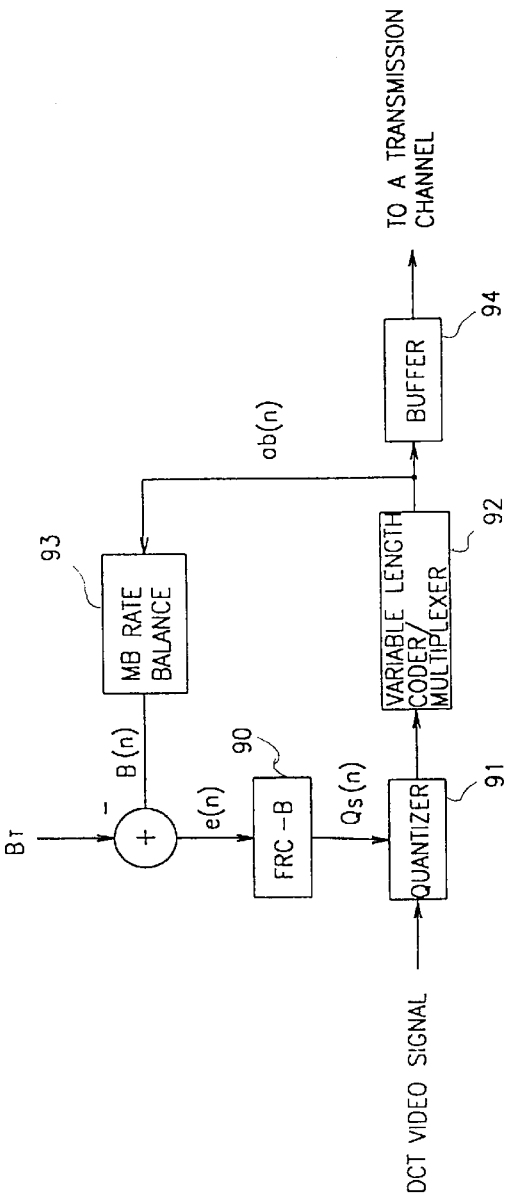
FIG. 9 shows the configuration of the FRC for MPEG video rate control according to the 2nd embodiment of the invention.

FIG. 9 shows the configuration of the FRC for MPEG video rate control according to the 2nd embodiment of the invention. As shown in FIG. 9, the FRC-B 90 of the 2nd embodiment of the invention accepts its input error signal e(n) as difference of B(n) and $B_T$, the set point. B(n) is the macro-block-wise bit-rate balance (MB rate balance) defined as following equation (2).

$$B(n) = \frac{(MBF - ab(n))/(MBN - n)}{MBB} \qquad (2)$$

where, MBF is the mean bits per frame, MBN is the total number of macro blocks in a picture, MBB stands for macro block rate balance, which is given by MBF/MBN and ab(n) represents the accumulated number of bits generated every macro block. When n is 0, ab(n) is set to the number of the remaining bits of the last macroblock, which is coded in the previous picture.

Therefore, the error signal e(n) and the differential error signal d(n) of the FRC-B are given as following equation (3).

$$e(n)=B_T-B(n)$$
$$d(n)=e(n)-e(n-1) \qquad (3)$$

where, $B_T$ is the target value of the balance, which is set to 1.

As the macro block index n increases, e(n) reflects the accumulated result of ab(n) to subsequent macro blocks. If larger number of bits are coded at earlier indices of n, the shortage of remaining number of bits will be distributed to later ones. It is fulfilled by large error signal e(n) of FRC-B input, large quantization step size Qs(n) of the FRC-B output. This fuzzy logic control scheme is considered to be effective in maintaining the average video rate close to MBF. Hence, FRC-B is said to be functionally the same as FRC of the 1st embodiment of the invention shown in FIG. 3 since both of them aim to control the video rate or the occupancy. But, FRC-B of the 2nd embodiment of the invention shown in FIG. 9 directly monitors the number of bits by setting the value of MBB.

Figure 10:
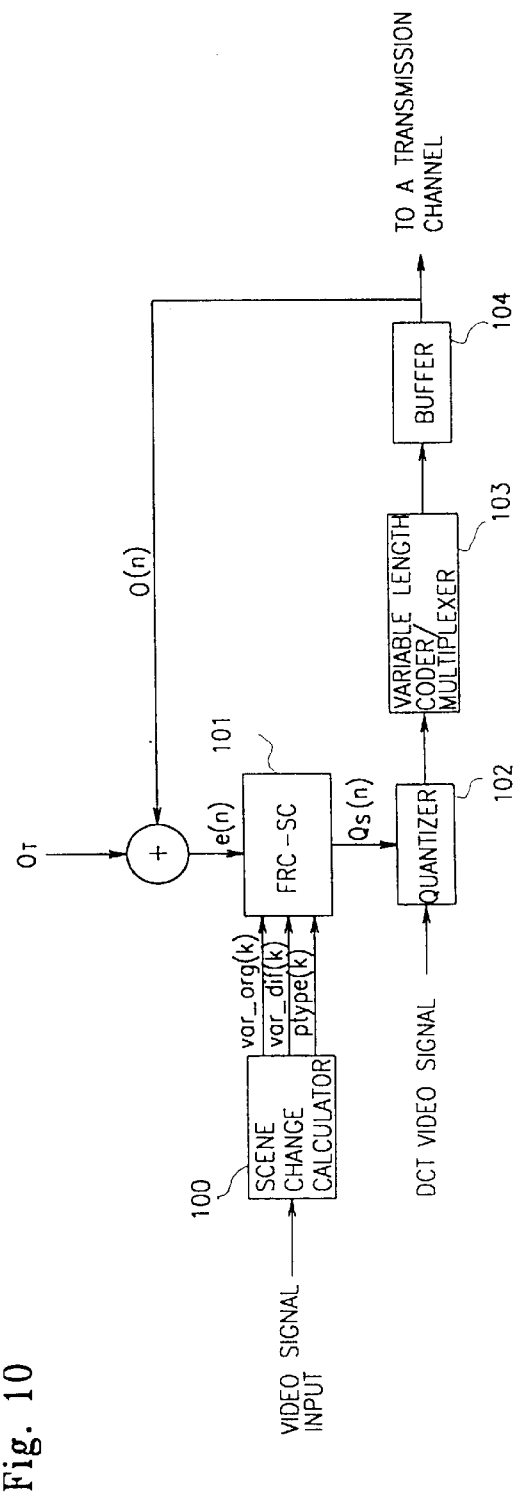
FIG. 10 shows the configuration of the scene change-assisted FRC for MPEG video rate control according to the 3rd embodiment of the invention.

FIG. 10 shows the configuration of the scene change-assisted FRC (FRC-SC) for MPEG video rate control according to the 3rd embodiment of the invention. FIG. 10 shows the detail configuration of the FRC-SC shown in the FIG. 10. As shown is FIG. 11, the scene change features are coupled with the scaling factor of FRC (ge(k), gd(k) and go(k)) in order to adaptively change inputs of the fuzzification process. A scene change calculator (SCC) 100 gives the three features (var_org, var_dif and ptype) to FRC-SC block 101 which generates scaling factor values depending on the features.

The scene change calculator 100 estimate the scene change for the input video. The scene change calculator 100 outputs three features to indicate frame-by-frame scene changes as inputs for the scale factor calculator 110. Three features for kth frame are two variances var_org(k), var_dif(k) and one picture type information ptype(k). They represent 1st order features of scene change, i.e. intra-frame variance, inter-frame variance, and picture type value. The variance, var_org(k) and var_dif(k) represent the variance within the input picture and variance between the current picture and the previous picture, respectively. The picture type information, ptype(k) has a single value according to the input picture (I,B,P).

The scale factor calculator 110 gives the scaling factor values, $g_e(k)$ and $g_d(k)$, from the above three scene change feature values by equation (4) as below.

$$g_e(k)=g_d(k)=(\log_{10}\text{var\_org}(k)/\log_{10}\text{var\_dif}(k))\times\text{ptype}(k) \quad (4)$$

where, k is the picture frame index. The logarithm is taken in order to scale down the dynamic ranges of the variances which often contain extremely large values. The ratio of var_org to var_dif is interpreted as follows; if var_org is bigger than var_dif- which means a picture has greater deal of details than inter-frame scene change-ge(k) and gd(k) becomes smaller accordingly, since such picture is assumed to be likely to entail a large amount of coded bits. On the other hand, a larger var_dif is assumed to contribute less to coded bits since a smaller var_org corresponds to a picture with less detail. The output scaling factor go(k) is set to 1 due to stability reason mentioned above. The rest of the scene change-assisted FRC shown in FIG. 11, that is, differential error calculator 111, fuzzifying block 112, decision making block 113, defuzzifying block 114 and their function are same as the FRC-based rate control shown in FIG. 4.

The above embodiments of the invention are designed to control the buffer occupancy or the bit rate—which are macro block variables measured and controlled at every macro block start—while the video quality is a framewise variable. The occupancy has causality in that the previous occupancy subsequently influences the current occupancy since the number of remaining bits in the buffer is added to the current occupancy when the next picture is being coded. On the other hand, the video quality is not causal since its value of a macro block or a frame is irrespective of that of a previous counterpart. Although two adjacent PSNR (Peak Signal to Noise Ratio) values may appear close to each other due to inter-frame correlation, the previous value dose not guarantee the same outcome for the current one. Therefore, a PSNR value of a macro block cannot be a suitable measure unless it is considered in a framewise way. That is, the scheme needs to be designed so that the framewise quality improves. In order to do so, it is required to determined a set point value for the framewise PSNR value (PSNRF) as following equation (5).

$$Q\text{-set}=255^2/10^{(PSNRF/10)}\times 256$$

$$TD=Q\text{-set}\times MBN \quad (5)$$

where, Q-set is the set point value of a framewise distortion for a given PSNRF. The multiplication term (256) represents the number of pixels in a macro block (for luminance, 16×16) and MBN the total number of macroblock in a frame. Thus, TD stands for the total target distortion of a frame. An accumulated distortion at macro block n, Ad(n) is expressed in a sum of squared error between an input macro block $mb_n$ and its reconstructed one $mb'_n$, following equation (6).

$$Ad(n) = \sum_{j=0}^{i}\left[\left(\sum_{l=0}^{15}\sum_{m=0}^{15}(mb_n(l,m)-mb_n(l,m)')^2\right)-\frac{TD}{MBN}\right] \quad (6)$$

where i and j are the macro block indices, and l and m are pixel indices, respectively. Thus, two inputs $e_q$ and $d_q$ are calculated as following equation (7).

$$e_q(n) = Q_T - \frac{Ad(n)}{TD}$$

$$d_q(n) = e_q(n) - e_q(n-1) \quad (7)$$

Figure 11:
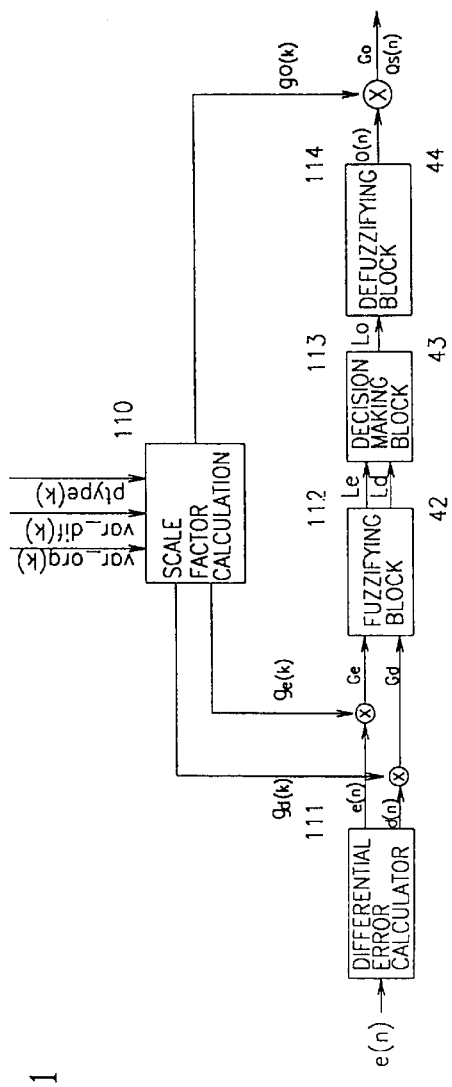
FIG. 11 shows the detailed configuration of the FRC-SC shown in the FIG. 10.
Figure 12:
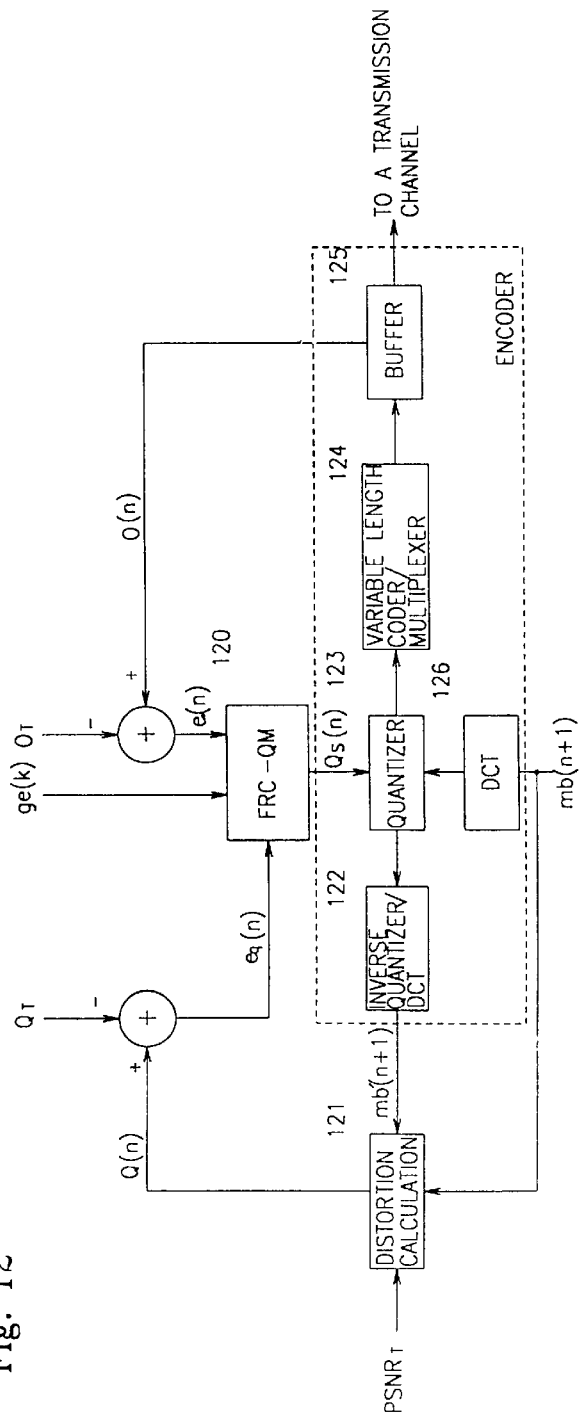
FIG. 12 shows the configuration of the quality-monitored FRC for MPEG video rate control according to the 4th embodiment of the invention.
Figure 13:
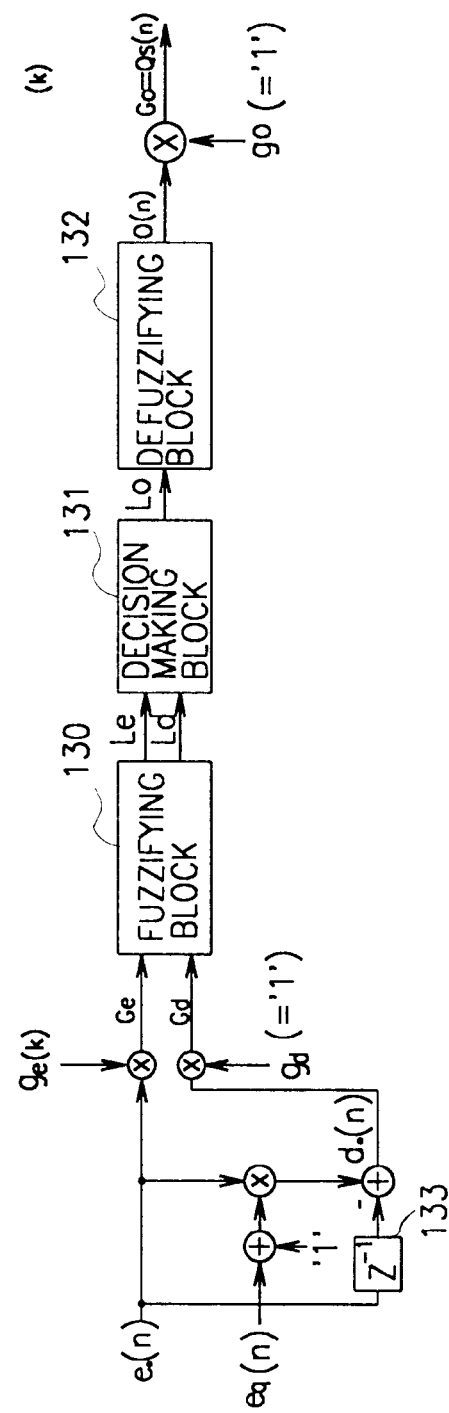
FIG. 13 shows the detail configuration of the FRC-QM shown in FIG. 12.

The relative video quality $e_q$ is represented with the macro block set point value $Q_T$ which is set to 1, and the differential quality $d_q$ by differencing current and previous eq's. Using equations (5), (6) and (7), the aim to control the quality can be achieved in a way which preceding macro block distortions can be distributed to subsequent macro blocks, signifies that the video quality is controlled not just for a macro block but for a whole picture. FIG. 12 shows the configuration of the quality-monitored (FRC-QM) according to the 4th embodiment of the invention. FIG. 13 shows the detail configuration of the FRC-QM shown in FIG. 12. For the quality-monitored FRC shown in FIG. 12 and FIG. 13, the same fuzzy rules and FAM are used in combination with above-mentioned quality control formulae. Quantizer 123, which accepts DCT coefficients and the quantization step size (Qs(n)), is located in the center of FRC-QM 120. The quantizer 123 outputs quantized DCT values for the inverse quantizer (IQ) and the inverse DCT (IDCT) 122. The quantized DCT values are also encoded by the variable length coder (VLC) and the multiplexer (MUX) 124. Q(n)=Ad(n)/TD in equation (7) is given by the distortion calculation (DC) block 121 in compliance of equation (7). The scaling factors ge(k) and the relative video quality eq(n) are introduced to FRC-QM 120. The eq(n) is defined in equations (5), (6) and (7), and ge(k) is given by the scene-change calculator (FIG. 11). Two crisp input variables of the FRC-QM, Ge(n) and Gd(n) is given as following equation (8).

$$G_e(n)=g_e(k)e_o(n)=g_e(k)(O(n)-O_T)$$

$$G_d(n)=(e_q(n)+1)e_o(n)-e_o(n-1) \quad (8)$$

where the term eq(n)+1 functions as a scaling factor for eo(n), representing the extent of the video quality. It ranges from 0 to 2 since eq(n) from −1 to 1 according to equation (7). In FIG. 13, fuzzification 130, decision making 131 and defuzzification 132 processes of the FRC-QM 120 are the same as the above mentioned FRC of the invention.

As described above, in the present invention fuzzy rule-based control schemes were applied to video rate control. A basic fuzzy logic control model was examined, using the occupancy as a fuzzy logic variable. Also a scene change feature-assisted FRC (FRC-SC), where scene change features of a frame were taken into account, was described as the advanced embodiment of the invention. The quality-monitored FRC (FRC-QM), which is controlled by both the quality factor and the scene change-based factor, appeared to be superior to the other schemes in respect of both the occupancy and the quality.

What is claimed is:

1. An apparatus for controlling a video rate for CBR MPEG video signal which is quantized by a quantizer, encoded by an encoder and then stored in a buffer to be transmitted through a transmission channel, the video rate controlling apparatus using fuzzy rule-based control comprising:

a differential error calculator calculating an error e(n) which is a difference between a target buffer occupancy $O_T$ and a current buffer occupancy O(n) and a differential error value d(n) which is a difference between the error e(n) and a previous error e(n−1);

a fuzzifying block translating the error and the differential error to linguistic input variables based on a membership function;

a decision making block making decision about linguistic judgement based on a predetermined set of rules and making a linguistic output value; and a defuzzifying block calculating crisp outputs for a quantization step size of the quantizer by a membership function of the linguistic output value, wherein the membership function has wider spacing in a middle range and narrower spacing in end ranges.

2. The video rate controlling apparatus according to claim 1, further comprising a multiplier that multiplies the error e(n) by a first scaling factor and the differential error d(n) by a second scaling factor to adjust a dynamic range of the signals.

3. The video rate controlling apparatus according to claim 2, wherein each of the scaling factors is constant.

4. An apparatus for controlling a video rate for CBR MPEG video signal which is quantized by a quantizer, encoded by an encoder and then stored in a buffer to be transmitted through a transmission channel, the video rate controlling apparatus using fuzzy rule-based control comprising:

a differential error calculator calculating an error e(n) which is a difference between a target buffer occupancy $O_T$ and a current buffer occupancy O(n) and a differential error value d(n) which is a difference between the error e(n) and a previous error e(n−1);

a fuzzifying block translating the error and the differential error to linguistic input variables based on a membership function;

a decision making block making decision about linguistic judgement based on a predetermined set of rules and making a linguistic output value; and a defuzzifying block calculating crisp outputs for a quantization step size of the quantizer by a membership function of the linguistic output value, wherein the predetermined set of rules is represented by FAM in which if the error is half and the differencial error is zero, then the linguistic output value is medium, and if the error is half or the differencial is zero, then the linguistic output value is not medium, and if the error is small and the differencial is big negative, then the linguistic output is smaller, if the error is full and the differencial error is positive big, then the linguistic output value is larger.

5. An apparatus for controlling a video rate for CBR MPEG video signal which is quantized by a quantizer, encoded by an encoder and then stored a buffer to be transmit through a transmission channel, the video rate controlling apparatus using fuzz rule-based control comprising:

macroblock rate balance calculating a macroblock bit rate balance value defined as following equation:

$$B(n) = \frac{(MBF - ab(n))/(MBN - n)}{MBB}$$

where, MBF is the mean bits per frame, MBN is the total number of macro blocks in a picture, MBB stands for macro block rate balance, which is given by MBF/MBN and ab(n) represents the accumulated number of bits generated every macro block. When n is 0, ab(n) is set to the number of the remaining bits of the last macroblock, which is coded in the previous picture;

differential error calculator calculating an error e(n) which is the difference between the B(n) calculated by the said macroblock rate balance and a target set point $B_T$ and a differencial error value d(n) which is the difference between the current error e(n) and the previous error e(n−1);

a fuzzifying block translating the error e(n) and the differencial error d(n−1) to a linguistic input variables based on a membership function;

a decision making block making decision about linguistic judgement based on a predetermined set of rules and making a linguistic output value; and a defuzzifying block calculating crisp outputs for a quantization step size of the quantizer by a membership function of the linguistic output value.

6. An apparatus for controlling a video rate for CBR MPEG video signal which is quantized by a quantizer, encoded by an encoder and then stored in a buffer to be transmitted through a transmission channel, the video rate controlling apparatus using fuzzy rule-based control comprising:

a scene change calculator calculating three feature values to indicate frame by frame scene change;

a differential error calculator calculating an error e(n) which is a difference between a target buffer occupancy $O_T$ and a current buffer occupancy O(n) and a differencial error value d(n) which is a difference between the error e(n) and a previous error e(n−1);

a scale factor calculator calculating scale factors for the error and the differential error on the basis of the three scene change feature values calculated by the scene change calculator;

a multiplying means multiplying the error e(n) the differential error d(n) by each respective scaling factor to adjust their dynamic range;

a fuzzifying block translating the error and the differential error to linguistic input variables based on a membership function;

a decision making block making a decision about linguistic judgement based on a predetermined set of rules and making a linguistic output value; and a defuzzifying block calculating crisp outputs for a quantization step size of the quantizer by a membership function of the linguistic output value, wherein the output of the scale factor calculator is the scale factor defined by the following equation:

$$g_e(k) = g_d(k) = (\log_{10} \text{var-org}(k)/\log_{10} \text{var-dif}(k)) \times \text{ptype}(k)$$

wherein k is a picture frame index, var-org(k) is an intra-frame variance, var-dif(k) is an inter-frame variance, and ptype(k) is a picture type value.

* * * * *